(12) United States Patent
Werner et al.

(10) Patent No.: US 10,020,742 B2
(45) Date of Patent: Jul. 10, 2018

(54) HYBRID BOOST-BYPASS FUNCTION IN TWO-STAGE CONVERTER

(71) Applicant: Power Integrations, Inc., San Jose, CA (US)

(72) Inventors: Antonius Jacobus Johannes Werner, Cambridge (GB); Matthew David Waterson, Cambridge (GB)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/824,483

(22) Filed: Nov. 28, 2017

(65) Prior Publication Data

US 2018/0083542 A1    Mar. 22, 2018

Related U.S. Application Data

(63) Continuation of application No. 14/854,266, filed on Sep. 15, 2015, now Pat. No. 9,866,122.

(51) Int. Cl.
*H02M 3/335* (2006.01)
*H02M 1/42* (2007.01)

(52) U.S. Cl.
CPC ......... *H02M 3/33507* (2013.01); *H02M 1/42* (2013.01); *H02M 3/335* (2013.01); *Y02B 70/12* (2013.01)

(58) Field of Classification Search
CPC ......... H02M 3/33507; H02M 3/33523; H02M 3/335; H02M 3/33515; H02M 3/33592;

(Continued)

(56) References Cited

U.S. PATENT DOCUMENTS 5,617,013 A    4/1997  Cozzi
5,786,992 A    7/1998  Vinciarelli et al.
(Continued)

FOREIGN PATENT DOCUMENTS

EP    0658968 A1    6/1995
EP    2741409 A2    6/2014
EP    2775598 A1    9/2014

OTHER PUBLICATIONS

EP Patent Application No. 16187399.7—Extended European Search Report, dated Feb. 28, 2017, 9 pages.

*Primary Examiner* — Jue Zhang
*Assistant Examiner* — Kevin H Sprenger
(74) *Attorney, Agent, or Firm* — Christensen O'Connor Johnson Kindness PLLC

(57) ABSTRACT

A controller for use in a two-stage power supply is coupled to control switching of a switching element to regulate a transfer of energy from an input to an output of a flyback converter. The controller activates a boost switching element during a first interval in each line half cycle of an input voltage to boost an output voltage at an output of a boost-bypass converter. The controller deactivates the boost switching element during a second interval in each line half cycle such that the output voltage of the boost-bypass converter drops towards the input voltage during the second interval while the output voltage of the boost-bypass converter is greater than the input voltage. The controller controls the output voltage to follow the input voltage during a third interval of each line half cycle while the boost switching element remains deactivated and the input and output voltages are substantially equal.

6 Claims, 4 Drawing Sheets

(58) Field of Classification Search
CPC ......... H02M 3/33576; H02M 3/33561; H02M 3/33569; H02M 3/157; H02M 3/1584
USPC ......... 363/21.12–21.13, 21.15–21.16, 21.18, 363/52–53, 125–126
See application file for complete search history.

(56) References Cited

U.S. PATENT DOCUMENTS

| | | | |
|---|---|---|---|
| 2010/0046262 A1* | 2/2010 | Wu | H02M 1/083 363/126 |
| 2010/0246226 A1* | 9/2010 | Ku | H02M 1/4225 363/126 |
| 2013/0249437 A1* | 9/2013 | Wang | H05B 33/0815 315/307 |
| 2014/0265935 A1* | 9/2014 | Sadwick | H05B 33/0815 315/307 |
| 2014/0268918 A1 | 9/2014 | Gong | |
| 2016/0248323 A1* | 8/2016 | Gritti | H02M 1/4225 |

* cited by examiner

HYBRID BOOST-BYPASS FUNCTION IN TWO-STAGE CONVERTER

CROSS-REFERENCE TO RELATED APPLICATIONS

This application is a continuation of U.S. patent application Ser. No. 14/854,266, filed on Sep. 15, 2015, now pending. U.S. patent application Ser. No. 14/854,266 is hereby incorporated by reference.

BACKGROUND INFORMATION

Field of the Disclosure

The present invention relates generally to power supplies, and in particular but not exclusively, relates to a new topology and control of switched mode power supplies.

Background

Switch mode power supplies are used in a wide variety of household or industrial appliances that require a regulated direct current (dc) voltage for their operation. There are a wide variety of known ac-dc (off-line) converter topologies for regulating an output quantity of power supply (voltage or current) by using control methods such as PWM (pulse width modulation), PFM (pulse frequency modulation), or on-off control/pulse skipping.

To interface with low frequency (e.g. 60 or 50 Hz) alternating current (ac) networks, an ac-dc front stage converter is often included to provide an efficient power exchange with the ac network as well as function as a power factor correction (PFC) converter at the interface to the ac network.

The two-stage converters are usually advantageous and utilized with a front-stage PFC Boost (as a power factor correction interface with the ac network) that is cascaded with a dc-dc converter (as a step-down voltage regulator). The front-stage PFC Boost receives a rectified ac sinusoidal waveform through a bridge rectifier and is implemented with a high frequency (HF) switching of a power switch to transfer energy through an inductive energy transfer element to the second stage of dc-dc converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Non-limiting and non-exhaustive embodiments of the present invention are described with reference to the following figures, wherein like reference numerals refer to like parts throughout the various views unless otherwise specified.

Figure 1:
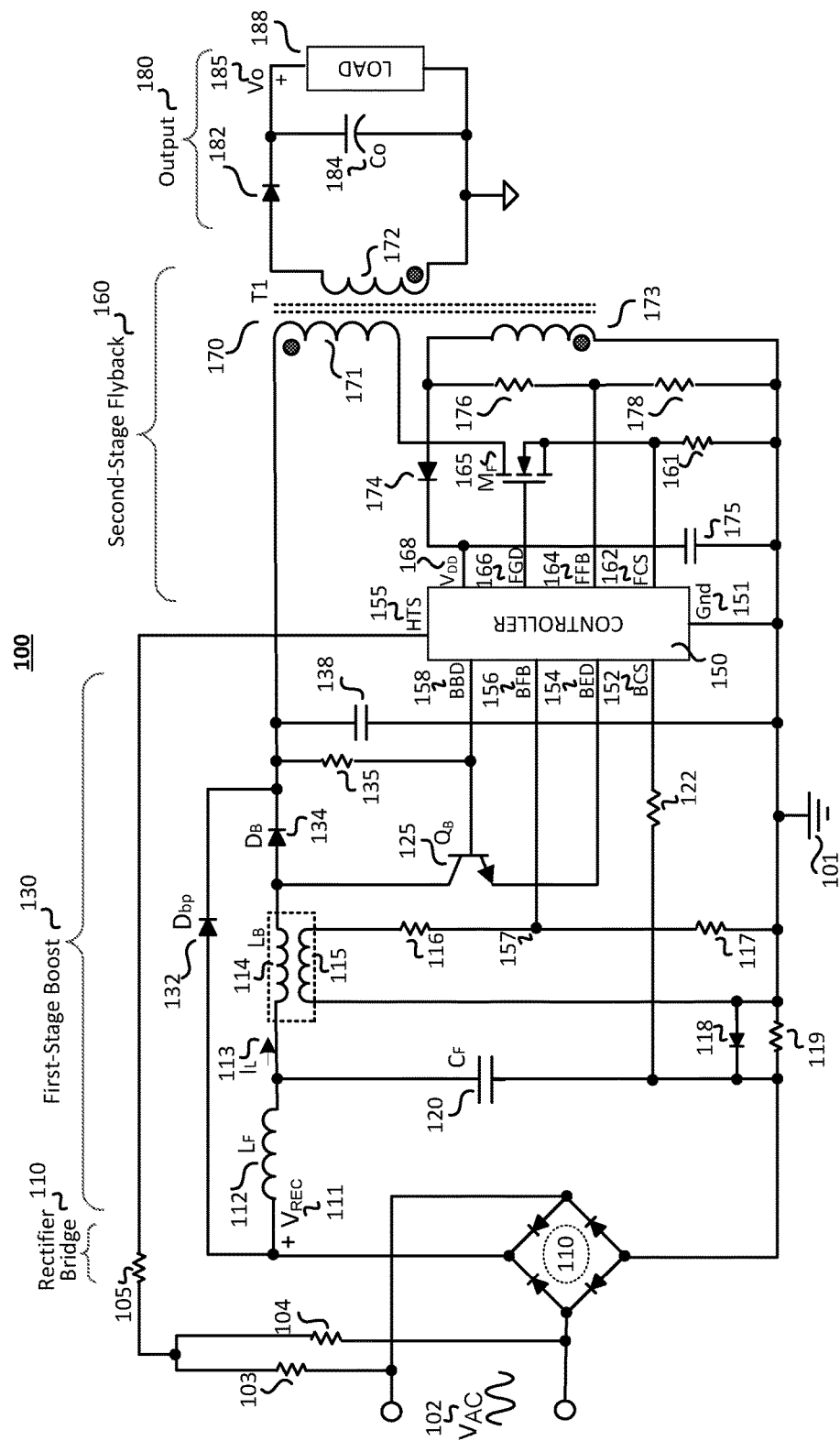
FIG. 1 is a schematic illustrating one example of a two-stage power converter consisting of a front stage converter with a Hybrid Boost-Bypass Function cascaded with a second-stage flyback converter in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed in further detail below, a novel topology and control technique is disclosed for hybrid boost-bypass functioning in a two-stage converter. In comparison to an ordinary bridge rectifier and bulk capacitor, an example first-stage boost converter in accordance with the teachings of the present invention saves space due to a very small amount of boost capacitance needed. For instance, an example first-stage boost converter in accordance with the teachings of the present invention operates with a non-standard boost control that provides increased efficiency of the two-stage converter by only running the boost function of the first-stage boost converter for a minimum time required in each half line cycle. The minimum required time of operation in each half line cycle for the first-stage boost converter is defined by the amount of energy needed to be stored in the boost output capacitor to provide a sufficient input voltage for the second-stage converter. The stored energy in the boost output capacitor is needed during the time interval that the boost function has stopped and the first-stage boost output voltage is dropping, which occurs around a zero crossing of the mains.

It is noted that even though the minimum time of operation for the first-stage boost converter increases the efficiency of the two-stage converter, the power factor (PF) at the input decreased. However, it is nevertheless possible in accordance with the teachings of the present invention to optimize the operation time of the first-stage boost converter to balance two objectives: (1) increasing efficiency over a 'standard' high-PF boost converter; and (2) maintaining a minimum power factor to satisfy obligatory requirements. Indeed, with an example two-stage converter with hybrid boost-bypass function in accordance with the teachings of the present invention, a power factor of PF≈0.7 is still achieved, while in a typical flyback converter with bridge rectifier and bulk capacitor, the power factor typically is reduced to a power factor of PF≈0.5.

To illustrate, FIG. 1 shows one example of a two-stage power converter 100 including a front stage boost converter with a Hybrid Boost-Bypass Function cascaded with a second-stage flyback converter in accordance with the teachings of the present invention. The power converter 100 includes a rectifier bridge 110 coupled to receive $V_{AC}$ 102 at input and generate a rectified output $V_{REC}$ 111 in reference to the ground reference 101. The two resistors 103 and 104 across the input ac line form a center point that through a third resistor 105 is coupled to terminal 155 HTS of the controller 150 to track the input line sinusoidal voltage and synchronize specific timing points on the line half cycle with the zero crossing. The full-wave sinusoidal rectified voltage $V_{REC}$ 111 is applied to an optional filter inductor $L_F$ 112 and to the filter capacitor $C_F$ 120.

The boost switching element in one example is a bipolar junction transistor BJT $Q_B$ 125 that receives a base drive control signal from controller terminal BBD (boost base drive) 158. Boost inductor current $I_L$ 113 is monitored across the coupled inductor 115 that is applied on the core of boost inductor $L_B$ 114 to generate the boost feedback BFB 156 by detecting the inductor zero current across resistive divider 117 and 116 (to control the boost critical conduction mode, CrM).

Boost current is sensed at return line across the sense resistor 119 and is applied to terminal BCS 152 of the controller 150 through a series resistor 122. The forward voltage drop of diode 118 (e.g., 0.6V) could limit the voltage drop on sense resistor 119 and on BCS terminal in the case of excessive current. It is appreciated that the controller 150 in this example includes an emitter drive as well that controls emitter current through an internal switch in series with terminal BED 154. The ground terminal Gnd 151 of the controller 150 is referenced to primary power ground 101.

The first-stage boost 130 output voltage across bulk capacitor 138 is applied to the second-stage flyback 160. The control signals for the second-stage flyback are included in the controller 150 and referenced to the primary ground 101 coupled to controller ground terminal Gnd 151.

As shown in the depicted example, the first-stage boost 130 is coupled to receive a full-rectified sinusoidal voltage waveform $V_{REC}$ 111 from the bridge rectifier 110. The main components of the first-stage boost converter 130 include: boost inductor $L_B$ 114, boost switching element that is a bipolar junction transistor $Q_B$ 125, boost diode $D_B$ 134, and the boost output bulk capacitor 138. The high frequency HF switching noise is bypassed through the filter capacitor 120. The coupled inductors 114 and 115 may detect the zero inductor current of $I_L$ 113 across the resistive divider 116 and 117. The zero inductor current signal from node 157 is coupled to the boost feedback terminal BFB 156 of the controller 150 to provide a critical conduction mode of operation for the first-stage boost 130.

It is noted that a first-stage boost may normally be utilized to provide power factor correction PFC at the input line terminals, and is usually coupled to the low frequency sinusoidal ac network. However, in the disclosed example two-stage converter in accordance with the teachings of the present invention, a non-standard control of the first-stage boost is disclosed that may provide additional benefits than a conventional PFC operation of a boost converter. The bypass diode $D_{bp}$ 132 in other solutions is normally used as a protection for the main boost diode $D_B$ 134 to bypass the inrush current at start up to charge the boost output bulk capacitor (e.g., capacitor 138) or to clamp any input surge that would otherwise harm the input components such as bridge rectifier 110 or filter capacitor 120.

Bypassing the surge current through diode $D_{bp}$ 132 may protect the main boost diode $D_B$ 134 during inrush current. The main boost diode $D_B$ 134 is usually a fast (e.g., Schottky, SiC, or other fast type diodes) with low forward drop that may be harmed during any inrush or surge current. In the disclosed example non-standard operation of the front-stage boost 130, the bypass diode $D_{bp}$ 132 functions differently and conducts consistently in a major portion of each line half cycle as will be described below in the waveforms of FIG. 2.

It is appreciated that the controller 150 provides a dual driver for boost bipolar transistor switch $Q_B$ 125 to drive the boost transistor base control signal from terminal BBD (boost base drive) 158 as well as the boost transistor emitter drive BED from terminal 154 of the controller 150. Resistor 135 on the base of boost transistor switch $Q_B$ 125 in some examples may serve as a pull up resistor during startup.

The output voltage of the first-stage boost 130 across boost bulk capacitor 138 is applied to the second-stage flyback 160 across the flyback energy transfer element that is depicted as transformer T1 170. The flyback energy transfer element T1 170 is in fact a coupled inductor, which is usually referred as a flyback transformer. The primary winding 171 is in series with flyback switching element (e.g., Mosfet $M_F$ 165) that receives the gate control signal across terminal FGD 166 of the controller 150.

The flyback transformer T1 170 has a primary winding 171, a secondary winding 172, and an auxiliary winding 173. The auxiliary winding 173 provides the flyback feedback signal FFB, through an optional scale down resistive divider 176/178, on terminal 164 of the controller 150. As well, the auxiliary winding 173 provides a dc supply for the controller, through rectifier diode 174 and capacitor 175, on terminal $V_{DD}$ 168.

All the control signals and the controller supply $V_{DD}$ 168, provided through the auxiliary winding 173, are referenced to the controller ground 151 that may be coupled to primary ground 101. The flyback feedback information from the flyback output is retrieved as an ac signal through the auxiliary winding 173 on T1 170 across the resistive divider 176 and 178. This ac signal on terminal 164 FFB carries two-fold information to the controller 150. The negative portion of this ac pulse (due to reverse winding directions of windings 171 and 173) provides the flyback input voltage information that is the boost output voltage.

The positive portion of the ac pulse from auxiliary winding 173 represents the transferred energy to the secondary winding 172 during off time of the flyback switching element 160 (due to reverse directions of the windings 171 and 172). This positive portion of the ac pulse generates the feedback signal of the flyback for the output voltage regulation. The flyback switch current is sensed across the flyback current sense resistor 161 on terminal FCS 162 of the controller 150. Controller 150 by processing all the sensed signals generates drive signal BBD 158 for the boost switching element $Q_B$ 125 and the drive signal FGD 166 for the flyback switching element $M_F$ 165.

Figure 2:
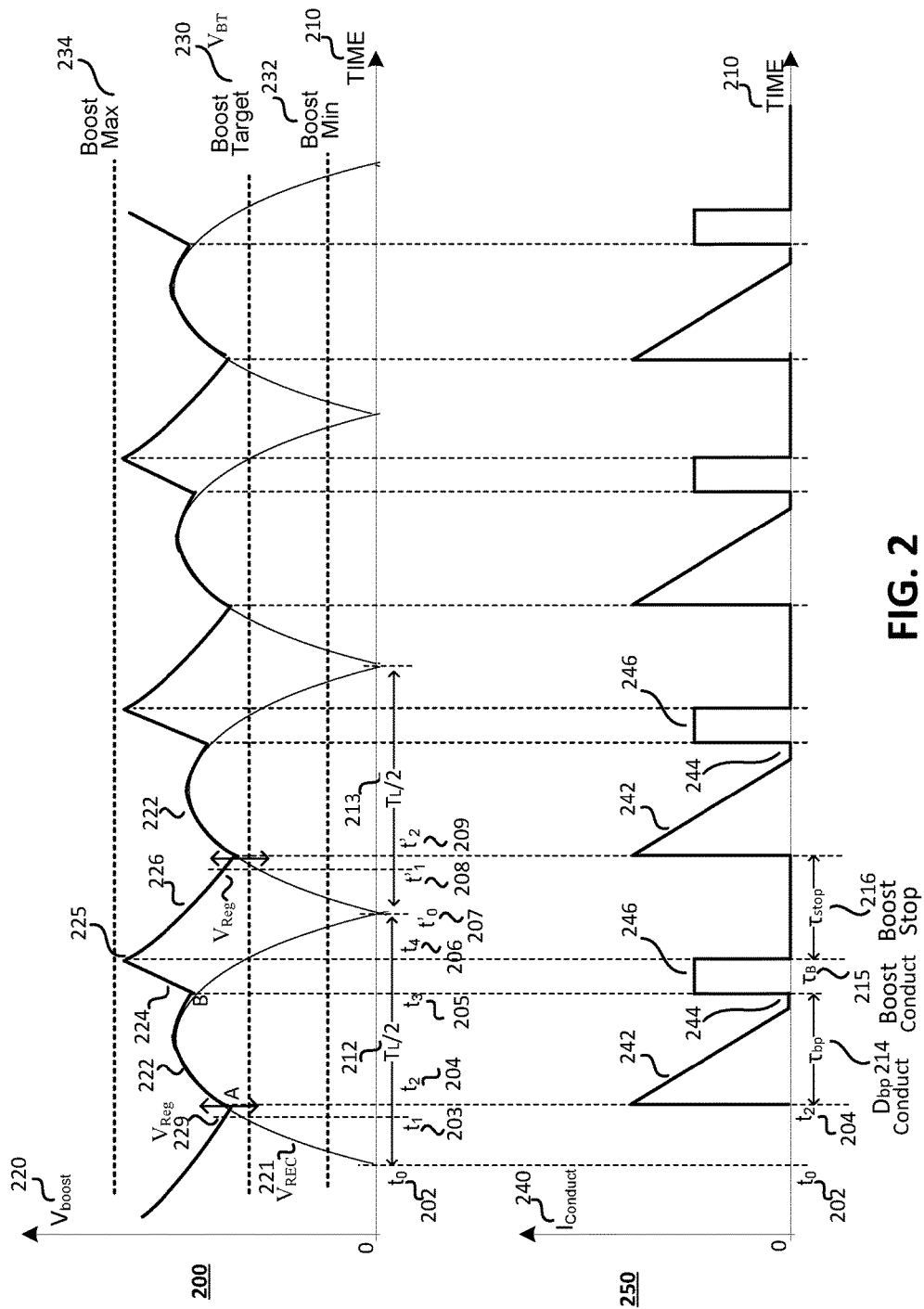
FIG. 2 illustrates voltage and current waveforms for the front stage Hybrid Boost-Bypass Function in accordance with the teachings of the present invention.

FIG. 2 illustrates voltage and current waveforms for the first stage converter with Hybrid Boost-Bypass Function in accordance with the teachings of the present invention. Horizontal axis shows the time 210 in the scale of sinusoidal line cycles for multiple consecutive half line cycles (e.g., $T_L/2$ 212 and 213). Vertical axis on the upper graph 200 shows the output voltage of the first-stage boost converter $V_{boost}$ 220 that is the voltage present on capacitor 138 in FIG. 1. The vertical axis on the lower graph 250 shows the conducted current through the first-stage boost converter $I_{conduct}$ 240.

The first-stage boost converter output voltage $V_{boost}$ 220 consist of three distinct sections 224 (first interval $\tau_B$ 215, Boost Conduct), 226 (second interval $\tau_{stop}$ 216, Boost Stop), and 222 (third interval $\tau_{bp}$ 214, Bypass diode Conduct).

From time $t_0$ 202 at zero cross of line cycle to a predetermined fixed time $t_1$ 203 (in one example, it is a fraction 3/32 of the line cycle), the boost switching is stopped (deactivated) and the first-stage output voltage $V_{boost}$ drops (slopes down 226). At time $t_1$ 203, point A 229 on the boost output voltage, before the boost output voltage $V_{boost}$ reaches the input rectified sinusoidal voltage $V_{REC}$ 221 ($V_{REC}$ 111 in FIG. 1), the value of boost output voltage at this specific time $V_{Reg}$ is measured and compared to a predetermined desired boost voltage, called "Boost Target" $V_{BT}$ 230.

If $V_{Reg} > V_{BT}$, it indicates that the boosting time interval from $t_3$ 205 to $t_4$ 206 (Boost Conduct time 215) has been more than required, and $V_{boost}$ has been shifted up (over boosting). To regulate back, the boost conduct time 215 would be reduced. On the other hand, if $V_{Reg} < V_{BT}$, it indicates that the boosting time interval from $t_3$ 205 to $t_4$ 206 (Boost Conduct time 215) has been less than required, and $V_{boost}$ has been shifted down (under boosting). To regulate back, the boost conduct time 215 would be increased.

When the first-stage output voltage $V_{boost}$ reaches the input rectified sinusoidal voltage $V_{REC}$ 221, the boost output voltage equals the input rectified sinusoidal voltage, and bypass diode (sometimes called as the surge diode) $D_{bp}$ 132 gets forward biased conducting. In the time interval $\tau_{bp}$, $t_2$ 204 to time $t_3$ 205, boost output voltage follows the input rectified sinusoidal voltage $V_{REC}$ 221 such that the boost output voltage and the input rectified sinusoidal voltage $V_{REC}$ 221 are substantially equal or almost equal during the time interval $\tau_{bp}$, $t_2$ 204 to time $t_3$ 205.

The time duration from time $t_3$ 205 to time $t_4$ 206 is called boost conduct time interval 215, at which time the first-stage boost converter functions in response to the boosting command from the boost controller and boosts up the first-stage boost output voltage $V_{boost}$ (ramp up section 224). The first-stage boost converter 130 runs for a time duration $\tau_B$ 215, which is controlled by a "Boost Time Regulator" control block (e.g., control block 397 in FIG. 3) that controls Vreg 229, as described above. The maximum amplitude of the $V_{boost}$ (ramp up section 224) at $t_4$ should not exceed the "Boost Max" voltage level 234.

After the boost conduct time interval $\tau_B$ 215, at time $t_4$ 206, the boost controller stops switching signals to the boost switching element ($Q_B$ 125 in FIG. 1). When the boost switching element $Q_B$ 125 is deactivated and stops switching, the first-stage output voltage $V_{boost}$ ramps down 226 (discharging the energy in boost bulk capacitor 138). The ramp down of $V_{boost}$ 226 continues and passes the zero cross point $t'_0$ 207 until it reaches the next half line cycle measurement point $t'_1$ 208 to command for the boost time regulation, and then again reaches the input rectified sinusoidal voltage $V_{REC}$ 221 at time $t'_2$ 209.

The lower graph 250 introduces the conducted current through the first-stage boost converter, $I_{Conduct}$ 240 during the half line cycles of the upper graph 200. As long as boost has stopped and the energy in boost output bulk capacitor 138 is discharging (from line zero cross $t_0$ 202 to time $t_2$ 204, before boost output voltage $V_{boost}$ hits the input rectified sinusoidal voltage $V_{REC}$ 221), no current is passing through the first-stage boost converter.

From time $t_2$ 204 to $t_3$ 205, while the bypass (surge) diode $D_{bp}$ 132 is conducting, current 242 in first-stage boost converter ramps down until current reaches to zero and may remain on zero for a short interval 244 while the output load energy is only provided through the boost output bulk capacitor 138. Duration of this time interval is denoted as bypass diode conduct $\tau_{bp}$ 214.

From time $t_3$ 205 to $t_4$ 206, while the boost switching is activated and starts functioning the boost output voltage ramps up (224) and a regulated current 246 is delivered through the first-stage boost converter to the second-stage flyback converter. The duration of this time interval is denoted as boost conduct $\tau_B$ 215. When the first-stage boost converter stops switching and boost output voltage is ramping down (226), no current is conducted through the first-stage boost converter. The duration of this time interval is denoted as boost stop $\tau_{stop}$ 216.

Figure 3A:
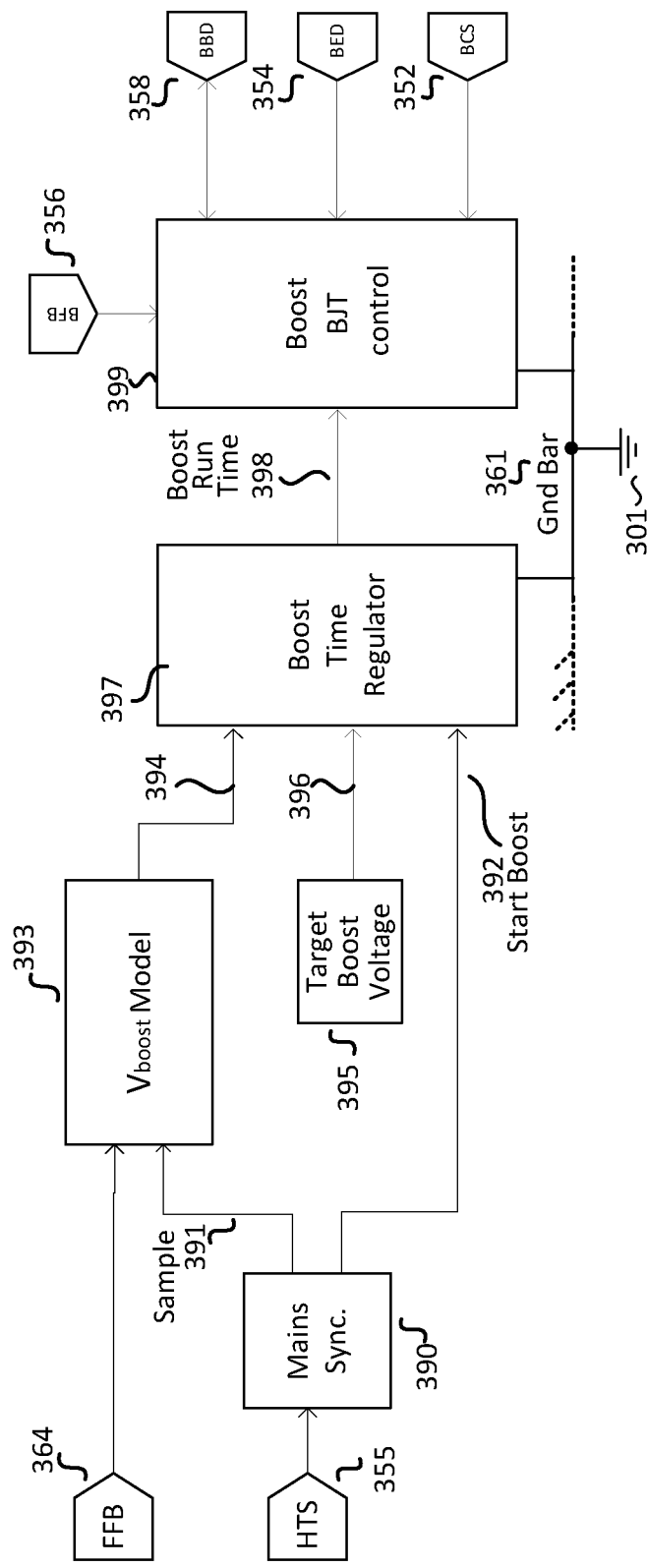
FIG. 3A shows an example of the control blocks for first stage Boost in accordance with the teachings of the present invention.

FIG. 3A shows an example of the control blocks for first-stage boost in accordance with the teachings of the present invention. The control blocks and control signals introduced in FIG. 3A are related to the first-stage boost converter. All the control blocks and control signals are referenced to ground bar, Gnd Bar 361, which is coupled to primary ground 301.

Signal HTS 355 from terminal 155 of the controller 150 (as shown in FIG. 1), receives information of the input ac line that is processed in the mains synchronized control block 390. The mains synchronized control block 390 generates two output signals. The start boost signal 392 is synchronized with the ac line zero crossing and defines start time for the first-stage boost switching function at a specific time point of the line sinusoidal half cycle (e.g., point B in FIG. 2). The second signal from mains synchronized block 390 is the sample signal 391 that is utilized to define a sampling time (point A 229 on FIG. 2, which in one example is a fraction 3/32 of line cycle after zero crossing) to measure and compare the boost output voltage with the boost target voltage.

The flyback feedback terminal FFB 364 is coupled to the auxiliary winding of the flyback transformer (173 in FIG. 1) and transfers the ac signal generated across the auxiliary winding, wherein the negative portion of this ac signal represents the input voltage to the second-stage flyback (160 in FIG. 1), or in other words is the output voltage of the first-stage boost (130 in FIG. 1).

The sample signal 391 signals to a voltage modeling control block called "$V_{boost}$ Model" 393 to take a sample, and through the Mains Sync block 390 to measure boost converter input voltage at sample time that is synchronized with line zero cross. The boost output voltage information is received through signal FFB 364.

The voltage modeling control block "$V_{boost}$ Model" 393 generates a Sampled $V_{boost}$ signal 394 to the "Boost Time Regulator" block 397. The "Boost Time Regulator" block 397 by receiving the Samples $V_{boost}$ signal 394 from the "$V_{boost}$ Model" control block 393 compares the sampled boost voltage 394 with the target boost voltage 396 that is received from "Target Boost Voltage" block 395, and based on the difference regulates the boosting time (e.g., boost conduct duration $\tau_B$ 215).

The boost start time is defined and synchronized by "Mains sync" block 390 generating signal "Start Boost" 392 to the control block "Boost Time Regulator" 397. The "Boost Time Regulator" block 397, by receiving the "Start Boost" signal 392 and Sampled $V_{boost}$ signal 394 from "$V_{boost}$ Model" block 393 in comparison to the desired value signal 396 from "Boost Target" block 395, generates "Boost Run Time" signal 398. The Boost Run Time" signal 398 may regulate (adjust) the boosting time, that is "Boost conduct" duration $\tau_B$ 215 in FIG. 2, for the next line half cycle to compensate deviation from the desired or target value of boost output voltage. The regulation process may be rather slow, taking up to several line cycles.

The output signal 398 "Boost Run Time" from the "Boost Time Regulator" 397 is coupled to BJT driver in the "Boost BJT Control" block 399 to control running the BJT boost switching element ($Q_B$ 125 in FIG. 1) for a boosting function of the first-stage converter. The "Boost BJT Control" block 399, by receiving boost current sense signal from terminal 352 (152 in FIG. 1) and boost feedback signal from terminal BFB 356, generates control signals for the boost base driver (terminal 358; 158 in FIG. 1) and to the boost emitter driver (terminal 354; 154 in FIG. 1). The "Boost Time Regulator" block 397 and "Boost BJT Control" block 399 may control or regulate the boost switching element running time (e.g., the first-stage boost conduct time $\tau_B$ 215). The boost switching element running time may control the crest point 225 in FIG. 2 of boost output voltage that then drops back tending towards a predetermined target boost voltage. In one example, it is appreciated that the BJT boost switching element advantageously may be controlled by individual drive signals to the base and to the emitter terminals of the BJT switching element.

Figure 3B:
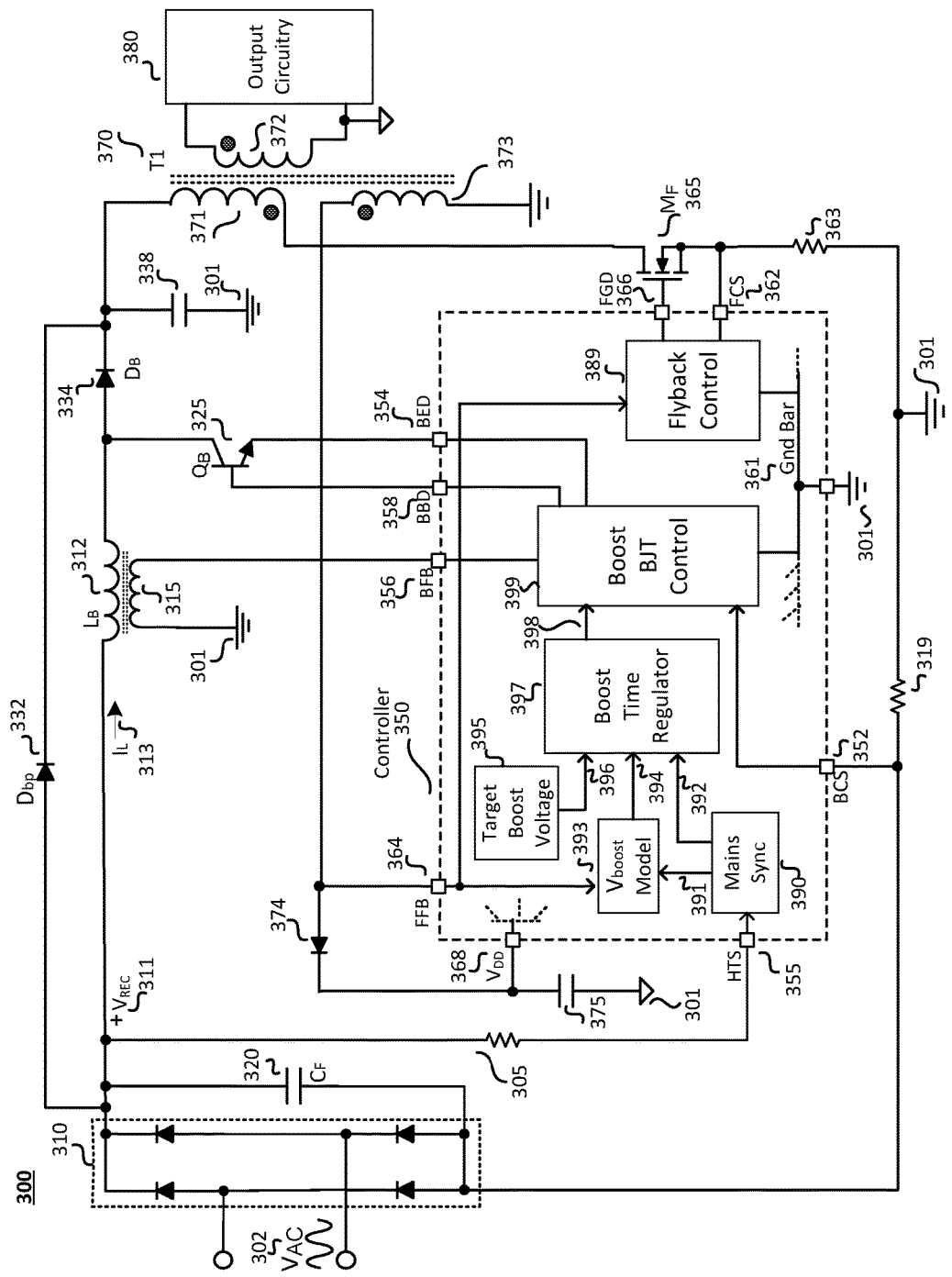
FIG. 3B shows an example of the control blocks for a first-stage Hybrid Boost-Bypass Function cascaded with a second-stage flyback in accordance with the teachings of the present invention.

FIG. 3B shows an example of the control blocks for a first-stage boost-bypass converter (with a so called hybrid boost-bypass function) cascaded with an example of a second-stage flyback in accordance with the teachings of the present invention.

Schematic 300 in FIG. 3B demonstrates more detail of the controller couplings in a two-stage power converter consisting of cascaded first-stage boost and second-stage flyback converters. The first-stage, or front-stage, boost converter includes a non-conventional, or non-standard, operation with a hybrid boost-bypass function in accordance with the teachings of the present invention. The second-stage flyback receives the non-regulated output voltage of the first-stage boost and generates a regulated flyback output voltage. The power converter 300 includes a rectifier bridge 310 coupled to receive $V_{AC}$ 302 from input line and generate a rectified voltage $V_{REC}$ 311 across input filter capacitor 320.

Input voltage through resistor 305 is applied to terminal HTS 355 of the controller 350. In various examples, it is appreciated that terminal HTS 355 may be coupled to either ac input voltage $V_{AC}$ (as illustrated for example in FIG. 1), or to the rectified input voltage $V_{REC}$ (as illustrated for example in FIG. 3B). Boost inductor $L_B$ 312 has a second winding 315 coupled to the controller terminal BFB 356 as the boost feedback signal to detect zero current of the inductor current $I_L$ 313 for a critical conduction mode (CrM) control of boost operation. As explained in FIG. 1, the boost switching element $Q_B$ 325 is controlled through base and emitter drive signals from the terminals BBD 358 and BED 354, respectively, for a boosting action during the boost conduct interval (e.g., duration $\tau_B$, 246 in FIG. 2). During boost conduct interval $\tau_B$, the boost output capacitor 338 is charged through boost diode $D_B$ 334. However, during the bypass diode $D_{bp}$ Conduct interval (duration $\tau_{bp}$, 214 in FIG. 2), which happens when boost switching has stopped and the boost output voltage has dropped and is following the line sinusoidal waveform (222 following $V_{REC}$ 221 in FIG. 2), the boost output capacitor 338 is charged directly from the input line through the bypass diode $D_{bp}$ 314.

During boost stop interval (duration $\tau_{stop}$, 216 in FIG. 2), no current or energy is transferred to the boost output capacitor 338, and the boost output capacitor 338 discharges or ramps down (226 in FIG. 2) towards the line sinusoidal voltage.

The first-stage boost output voltage across capacitor 338 is applied to the flyback transformer 370. The primary winding 371 of flyback transformer 370 is coupled to the flyback switching element, which in one example may be a Mosfet switch $M_F$ 365. The current through the flyback switching element is sensed across a sense resistor 363 in reference to primary ground 301, and is coupled through terminal FCS 362 of the controller 350 to "Flyback Control" block 389. The control terminal (e.g., gate terminal) of the flyback switching element 365 is coupled to terminal FGD 366 of the controller 350 and receives flyback gate drive signal from the flyback control block 389 to perform switching in response to the flyback feedback signal FFB 364 and flyback current sense signal FCS 362 to regulate output of flyback through secondary winding 372 across the output circuitry 380.

The auxiliary winding 373 on the flyback transformer 370 provides feedback signal FFB for flyback converter on terminal 364 of the controller 350. Signal FFB 364 from auxiliary winding 373 is an ac pulse that the negative portion provides the flyback input voltage information, which is the boost output voltage. Due to reverse directions of the secondary winding 372 and auxiliary winding 373 in regard to the primary winding 371, the positive portion of the ac FFB signal from auxiliary winding 373 represents the transferred energy to the secondary winding 372 during off time of the flyback switching element 365 and is utilized for the flyback output voltage and current regulation.

The dc supply for different control blocks of the controller 350 is also generated through auxiliary winding 373 by adding rectifier diode 374 and capacitor 375 across terminal $V_{DD}$ 368 and referenced to the primary ground 301. The auxiliary winding 373 and all the control signals for the controller 350 are referenced to the ground bus 361 and the primary ground 301.

In one example, the boost control blocks "Mains Sync" 390, "Vboost Model" 393, "Target Boost Voltage" 395, "Boost Time Regulator" 397, and the "Boost BJT Control" 399, illustrated in FIG. 3B have the same functionality as their counterpart boost control blocks illustrated in FIG. 3A.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a two-stage power supply including a first stage cascaded with a second stage,
   wherein the first stage of the two-stage power supply comprises:
   a boost-bypass converter, including:
   a boost inductor coupled between an input of the boost-bypass converter and an output of the boost-bypass converter, wherein an input voltage of the boost-bypass converter is a rectified input line sinusoidal voltage coupled to be received at the input of the boost-bypass converter; and
   a boost switching element coupled to the boost inductor;
   wherein the second stage of the two-stage power supply comprises:
   a flyback converter including an input coupled to the output of the boost-bypass converter, wherein the flyback converter further includes:
   an energy transfer element coupled between the input of the flyback converter and an output of the flyback converter;
   a flyback switching element coupled to the energy transfer element; and
   the controller,
   wherein the controller is coupled to control switching of the flyback switching element to regulate a transfer of energy from the input of the flyback converter through the energy transfer element to the output of the flyback converter, wherein the controller is further coupled to the boost switching element, wherein the controller includes logic that when executed by the controller causes the controller to perform operations including:
   activating the boost switching element during a first interval in each line half cycle of the input voltage to boost an output voltage at the output of the boost-bypass converter;
   deactivating the boost switching element during a second interval in said each line half cycle of the input voltage, wherein the output voltage of the boost-bypass converter is coupled to drop towards the input voltage during the second interval while the output voltage of the boost-bypass converter is greater than the input voltage; and
   controlling the output voltage of the boost-bypass converter to follow the input voltage during a third interval of said each line half cycle of the input voltage while the boost switching element remains deactivated and the input and output voltages are substantially equal.

2. The controller of claim 1, wherein the boost-bypass converter further comprises:
   a bypass diode coupled between the input of the boost-bypass converter and the output of the boost-bypass converter, wherein in each line half cycle during normal operation energy is transferred between the input and the output of the boost-bypass converter through the bypass diode during the third interval;
   a boost output bulk capacitor coupled to the output of the boost-bypass converter; and
   a boost rectifier diode coupled between the boost inductor and the boost output bulk capacitor at the output of the boost-bypass converter, wherein the bypass diode is coupled between the input of the boost-bypass converter and the boost output bulk capacitor at the output of the boost-bypass converter to bypass the boost inductor, the boost switching element, and the boost rectifier diode.

3. The controller of claim 1, wherein the boost switching element comprises a bipolar junction transistor (BJT), and wherein the flyback switching element comprises a MOSFET switch.

4. The controller of claim 1, wherein the boost-bypass converter further comprises a voltage modeling control block coupled to synchronize switching of the boost switching element in response to zero line crossings in the input voltage.

5. The controller of claim 4, wherein the energy transfer element of the flyback converter comprises a flyback transformer including a primary winding, a secondary winding, and an auxiliary winding, wherein the voltage modeling control block is further coupled to be responsive to a portion of an AC pulse induced in the auxiliary winding.

6. The controller of claim 4, wherein the boost-bypass converter further comprises a boost time regulator coupled to receive a boost output voltage modeling signal from the voltage modeling control block, wherein the boost time regulator is coupled to generate a boost run time signal to regulate the first interval of each line half cycle of the input voltage to boost the output voltage at the output of the boost-bypass converter in response to the boost output voltage modeling signal from the voltage modeling control block.

* * * * *